United States Patent [19]

Bischel et al.

[11] Patent Number: 5,495,697
[45] Date of Patent: Mar. 5, 1996

[54] DECORATIVE ELEMENTS FOR SUBCEILINGS

[76] Inventors: Wesley T. K. Bischel, 707 McGrann Blvd., Lancaster, Pa. 17601; Joan V. Greenslade, 120 Letort Rd., Millersville, Pa. 17551; Chester W. Hallett, 1959 Lititz Pike; Henry G. Stein, 106 Treetops Dr., both of Lancaster, Pa. 17601

[21] Appl. No.: 217,534

[22] Filed: Mar. 24, 1994

[51] Int. Cl.⁶ ..................................... F04B 9/26
[52] U.S. Cl. ................ 52/311.3; 52/506.07; 52/664; 403/401
[58] Field of Search ................ 403/401; 52/311.3, 52/664, 506.07, DIG. 8

[56] References Cited

U.S. PATENT DOCUMENTS

| | | | |
|---|---|---|---|
| 2,990,037 | 6/1961 | Fowles | 52/506.07 X |
| 3,319,389 | 5/1967 | Levine | 52/506.07 X |
| 4,034,531 | 7/1977 | Balinski | 52/506.07 |
| 4,452,021 | 6/1984 | Anderson | 52/506.07 |
| 4,722,161 | 2/1988 | Young | 52/506.07 |
| 4,848,054 | 7/1989 | Blitzer et al. | 52/DIG. 8 X |
| 4,926,606 | 5/1990 | Hauson | 52/506.07 |

FOREIGN PATENT DOCUMENTS

| | | | |
|---|---|---|---|
| 3011392 | 10/1981 | Germany | 52/506.07 |
| 2142356 | 1/1985 | United Kingdom | 52/506.07 |
| 2163787 | 3/1986 | United Kingdom | 52/506.07 |
| 2173227 | 10/1986 | United Kingdom | 52/506.07 |

*Primary Examiner*—Carl D. Friedman
*Assistant Examiner*—Chritsopher Todd Kent

[57] ABSTRACT

Miniature hollow beams for easy installation onto a conventional inverted T-bar subceiling framework are disclosed. The beams comprise two flat portions adapted to fit snugly against the T-bar rail, the beams having two hooked arms that snap over the edges of the rail and inwardly sloping, downwardly extending sidewalls that provide a decorative V-shaped or U-shaped appearance when sighted from below.

4 Claims, 3 Drawing Sheets

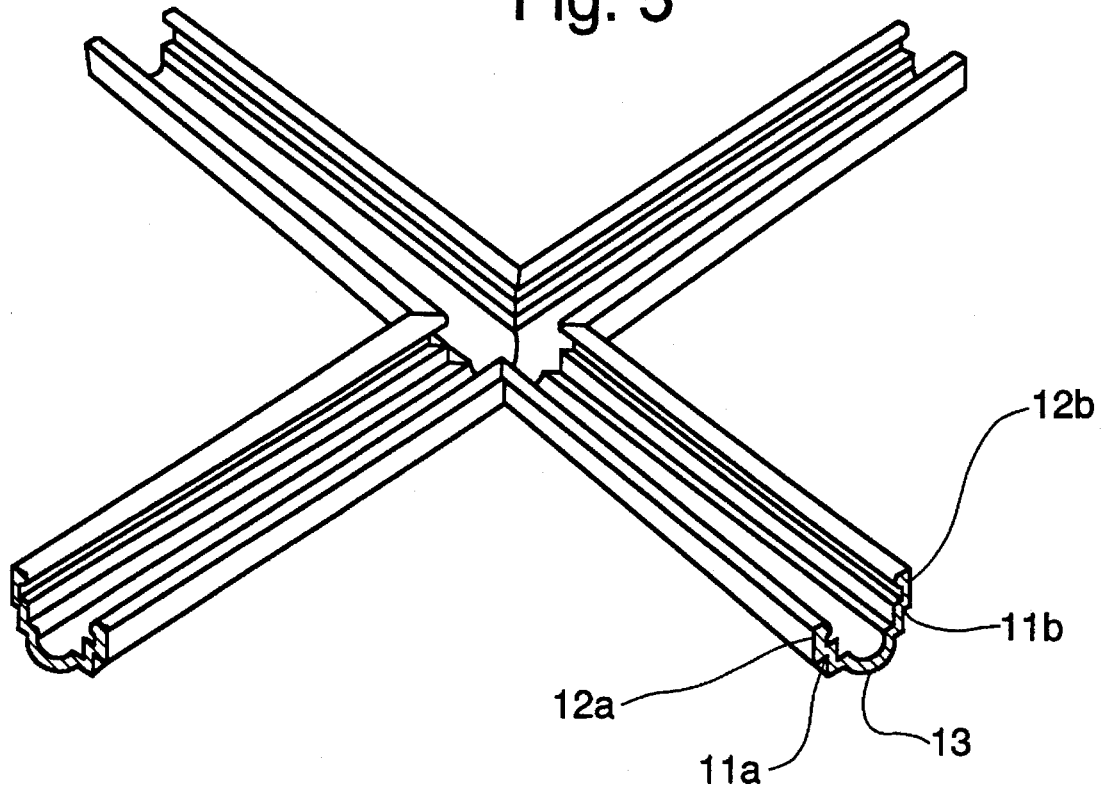

DECORATIVE ELEMENTS FOR SUBCEILINGS

This invention relates to subceilings of the type that utilizes square or rectangular panels supported on a suspended framework of interconnected inverted T-bar rails arranged in a series of geometric grid-like patterns, e.g., square, rectangular, etc. More particularly, this invention relates to decorative elements for covering the bottom surfaces of the T-bar rails while the panels rest on and are supported on the top surfaces of the T-bar rails.

BACKGROUND OF THE INVENTION

1. Field of the Invention

Subceilings formed from square or rectangular panels resting on the top surfaces of horizontally disposed flanges of inverted T-bar rails are well known. Typically, a framework of rails is formed with parallel main runners, suspended from the ceiling above, intersecting with cross rails to provide a grid pattern, usually as 2 feet ×2 feet squares or 2 feet ×4 feet rectangles, to accommodate similarly-sized subceiling panels. In its basic functional form, the subceilings would have the bottom surfaces of the rail flanges exposed as flat boundary strips between the edge supported panels.

For what has become the conventionally styled and dimensionally standardized version of the inverted T-bar rail, the industry has developed tight-fitting capping elements. By cutting and removing a portion of the panel along its length- and width-extending bottom edges to accommodate the thickness of the capped T-bar rails, a substantially smooth flat bottom surface of the subceiling may be defined.

It has been an objective to provide the option of various architecturally-satisfying decorative effects in suspended ceilings that have exposed flat T-bar flanges in addition to the mere capping discussed in the previous paragraph. It has also been an objective to provide such decorative effects with elements that are designed to be easily added in place or easily removed and replaced to satisfy the customer's "addiction" to his or her "remodeling habit".

2. Description of the Prior Art

In U.S. Pat. No. 4,848,054, the patentee has provided a hollow beam that is readily ,attachable from below onto the bottom flanges of the T-bar rails of the conventional T-bar support without requiring additional fastening hardware or tools. The beams are supported by return flanges at the top of their vertical sidewalls, resting on the top sides of the flanges of the T-bar rail. The beams may be reinforced by a transverse web bridging the top region of the sidewalls. A longitudinal groove is provided along the upper portion of each vertical sidewall. The inward intrusions of the grooves, in co-operation with the bridge web when used, function as a strike plate against the bottom side of the rail flanges to constrain the beam from skewing or working upwards.

To accommodate clearance at the intersections of the inverted T-bar rails that function as main runner members and cross runner members, notches must be provided in the beams. However, as shown in FIG. 7 of U.S. Pat. No. 4,848,054, this system provides a discontinuous appearance when viewed from below.

It is a similar object of the present invention to provide beams for capping the inverted T-bar support rails used in conventional support systems for subceilings that are readily attachable and removable from below without using any additional fastening hardware.

It is a further object of the present invention to provide a beam that is, once in place, constrained from undesired movement such as skewing or riding upwardly on the rail flanges.

It is a still further object to provide an element that is simpler and less expensive than the hollow beams with vertical sidewalls of the prior art and displays a substantially greater amount of versatility and ease of installation, particularly in providing a novel and a more integrated appearance at the intersections of the runners than the hollow beams of the prior art.

SUMMARY OF THE INVENTION

The objects of this invention are accomplished by a decorative capping beam for covering the inverted tee-bar (T-bar) panel support rail comprising:

flat portions each having an upper surface and a bottom surface and a width defined by two longitudinal edges;

a first return flange disposed along one upper edge of one flat portion integral therewith and extending inwardly;

a second return flange disposed along the second flat portion integral therewith and extending inwardly;

each of said return flanges having a downwardly-facing surface and an inwardly-facing edge;

said return flanges adapted to hold the upper surface of each flat portion substantially flush against the longitudinally extending T-bar rails of the runner member;

a pair of inwardly sloped sidewalls integral with and extending downwardly from said bottom surfaces of said flat portions and longitudinally along the length of said bottom surfaces of said flat portions, said sidewalls being connected to each other or integral with each other to provide a substantially V-shaped or a substantially U-shaped visual appearance when viewed from below.

In simple terms, the invention is the combination of a tee-shaped ceiling support grid to which dimensional decorative elements are applied. The elements snap on the face of the grid via resilient hooked arms. Extending from the arms are inwardly projecting walls with projections adapted to lie against the face of the tee-shaped grid when engaged. The inwardly projecting walls are arranged to provide the substantially U-shaped or V-shaped decorative portion of the beam. Besides a precise "U" or "V" shape, the inwardly sloping walls may be jagged or irregularly curved or angled but provide an overall appearance of a "U" or "V" shape to the observer. The snap-on feature is not necessarily integral with the decorative feature; but in the process of manufacture, this feature is easily integrated into the molding or extrusion operation.

The decorative element of this invention may be extruded, molded, or machined from plastic, wood, metal, composite materials or any material with sufficient flexibility as a thin member to allow the element to snap over the tee grid. Preferred is a material with low thermal expansion (Coefficient of Thermal Expansion of less than or equal to $3.0 \times 10^{-5}$ in/in° F.) similar to the grid. In this way, the decorative element does not move, warp, or gap with changes in ambient temperature once it is applied to the grid.

This invention will bring a new ease to designing and manufacturing grid. Metal roll forming, which is typically used to produce grid, would have required a new roll forming mill for each design desired on the grid face. A new mill is a costly investment. To change from one design product to another would be quite expensive and time consuming. With the present invention, new roll formers are no longer required since no change is made to the grid. To change the appearance of the grid using the present invention, one simply applies a different decorative element to the tee grid. The saving of time, money and effort is substantial.

Furthermore, by using a method other than roll forming, permits the formation of complex designs for the decorative element. This flexibility, in turn, lends itself to creating visually integrated ceiling systems. The ceiling board could be cut to complement the decorated grid visually.

Also, the elements of this invention could be designed to be compatible with tegularized ceiling board edge details as well as with flush panels. For larger decorative elements extending beyond the face of the tee grid, the ceiling board could be specially cut along its edge so that the board may rest on the tee-shaped ceiling support grid. This synergy of the ceiling and grid greatly enhances the overall appearance of an accessible ceiling. Alternatively, the board could be cut to rest on the decorative element directly.

A critical element of a ceiling suspension system is the intersection of members that are perpendicular to one another, e.g., where four ceiling boards meet. To accommodate any profile that the decorative element might have, the present invention may utilize a double miter at the end of each profile in the intersection. This feature is profile independent, thus providing a universal intersection. In addition, the appearance is tailored and identical at each intersection in the ceiling. No further notching of the decorative element is required, either at the factory or on the job site, as in the beams disclosed in U.S. Pat. No. 4,848,054, to allow clearance for the intersection of the support grid. The underlying tee-shaped grid may still intersect in a flush manner as is typical for this type of suspension system, but this unattractive intersection would not be visible from the room below since the mitered decorative elements of this invention would cover it.

The advantages of the present invention may be summarized, as follows:

1. Preparation of the decorative element requires less material than required for the hollow beam of U.S. Pat. No. 4,848,054.

2. It is easier to snap the decorative element onto the tee grid than shown in the prior art. No "rocking" is required to engage the element.

3. The decorative elements of this invention do not have sidewalls in the same plane as the snap-on element. In addition, each profile has internal flat portions or projections, which are used to register the decorative element on the grid.

4. The flat portions of the decorative element comprise an improvement over the longitudinal grooves or the bridge web disclosed in the prior art. The small, flat portions allow for tight registration to the T-bar grid, yet provide for freedom of movement for the "legs" of the snap-on elements to snap over the grid and snugly attach to the grid.

5. Use of the "internal" flat portions for registration also yields greater flexibility of design. The longitudinal groove used for registration in the prior art is visually disruptive. In addition, the groove mandates size constraints on the decorative element in that the hollow beams of U.S. Pat. No. 4,848,054 must be large enough to accommodate the longitudinal grooves. By internalizing the registration, the design of the element of this invention allows for small, intricate profiles.

6. By moving the sidewalls out of the plane of the snap-on element, this invention improves the ease of application to the grid. These designs lend themselves to automated or machine application. When force is applied to a center point of the decorative element, the force is transferred outwardly as well as upwardly over the grid. This provides for greater flexing of the profile so that the decorative element can be attached to the T-bar grid by a pushing motion instead of a rolling motion. The snap-on elements thus engage simultaneously as opposed to the sequential rolling of the application method described in the prior art. "Pushing" would be simpler to automate than sequential rolling.

7. The decorative face need not be the same size as the tee grid face as in the prior art.

8. The flexibility of design allows coordination between the design of the ceiling board with the design of the decorative element resulting in a distinct improvement in accessible ceiling appearance.

9. By using thermally stable material to make the element permits its application in the factory, as well as on site, without the decorative elements "drifting" on the tee grid due to exposure to changes in temperature during shipping or at the installation site.

10. Most important, the double mitered intersection will require no notching of the decorative element of this invention to accommodate the underlying tee grid intersection. In addition, the double miter will provide an improved, tailored appearance to the observer below.

BRIEF DESCRIPTION OF THE DRAWINGS

The invention will be more clearly understood by referring to the drawings and the detailed description that follows.

FIG. 5 is a top view, in perspective, of the mitered intersecting of two runner beams and two cross beams of FIGS. 2 and 4.

DETAILED DESCRIPTION

Figure 2:
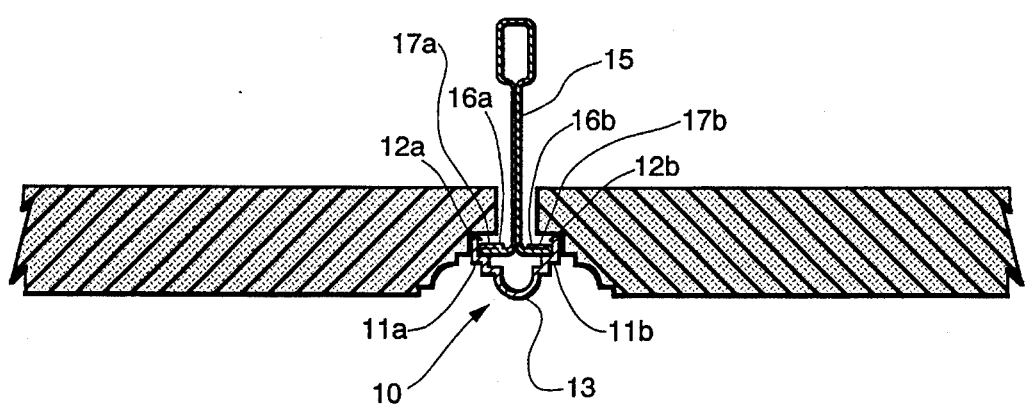
Figure 4:
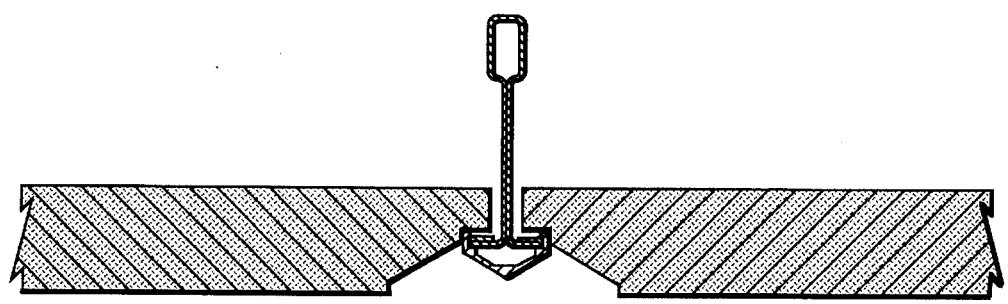

FIGS. 2 and 4 are cross-sectional views showing the configuration of a beam 10 constructed in accordance with the present invention. Beam 10 is basically composed of two associated elements: the decorative element 13, which may be integral with the substantially resilient fastening element. The fastening element is composed of substantially horizontal flat projections or face portions 11a and 11b adapted to contact the outer surface of the T-bar and hooked arms or return flanges 12a and 12b along each upper edge integral with the face portions 11a and 11b and extending inwardly.

Beam 10 may be fabricated from metal, wood, etc., but preferably it is fabricated from a flexible tough plastic such as polypropylene, high density polyethylene, an acrylic copolymer or homopolymer, etc. To install beam 10 onto the "T-bar rail" 15, the beam 10 is merely pushed as it is forced over the rolled flanged edges 16a and 16b of the "T-bar rail" 15.

The inverted T-bar rails 15 comprise the framework suspended in a grid pattern to support the square or rectangular panels that form the ceiling. They represent the type of inverted T-bar rails that are currently used for both residential and commercial ceilings. The support wires, that serve to suspend the rails by being looped through an opening in the rails and then connected to the building structure above them, are not shown. A relatively mild force applied by hand holds return flanges 12a and 12b upwardly against the sides of the edges of flanges 16a and 16b, respectively.

By continuing to apply the mild pressure, the return flanges or arms 12a and 12b ultimately snap over and rest on the flanges 16a and 16b and flat portions 11a and 11b fit snugly against the outer surface of the "T" of the T-bar rail 15. Flat portions 11a and 11b act as strike plates to constrain any skewing or other movement of the beam 10.

The end portions of ceiling panels 17a and 17b are shown in place resting on return flanges 12a and 12b with the decorative elements 13 of beam 10 serving to provide a covering for the usually metal surface of the T-bar rail 15. The final result is a smooth, visually effective ceiling.

A second beam with its decorative element and associated with the other basic elements is shown in FIG. 4. It should be noted that the elements 13 in FIGS. 2 or 4 may extend from flat portions 11a and 11b of the fastening element to a level where the decorative elements are below, above, or at the same level as the exposed surface of the ceiling panel.

Figure 1:
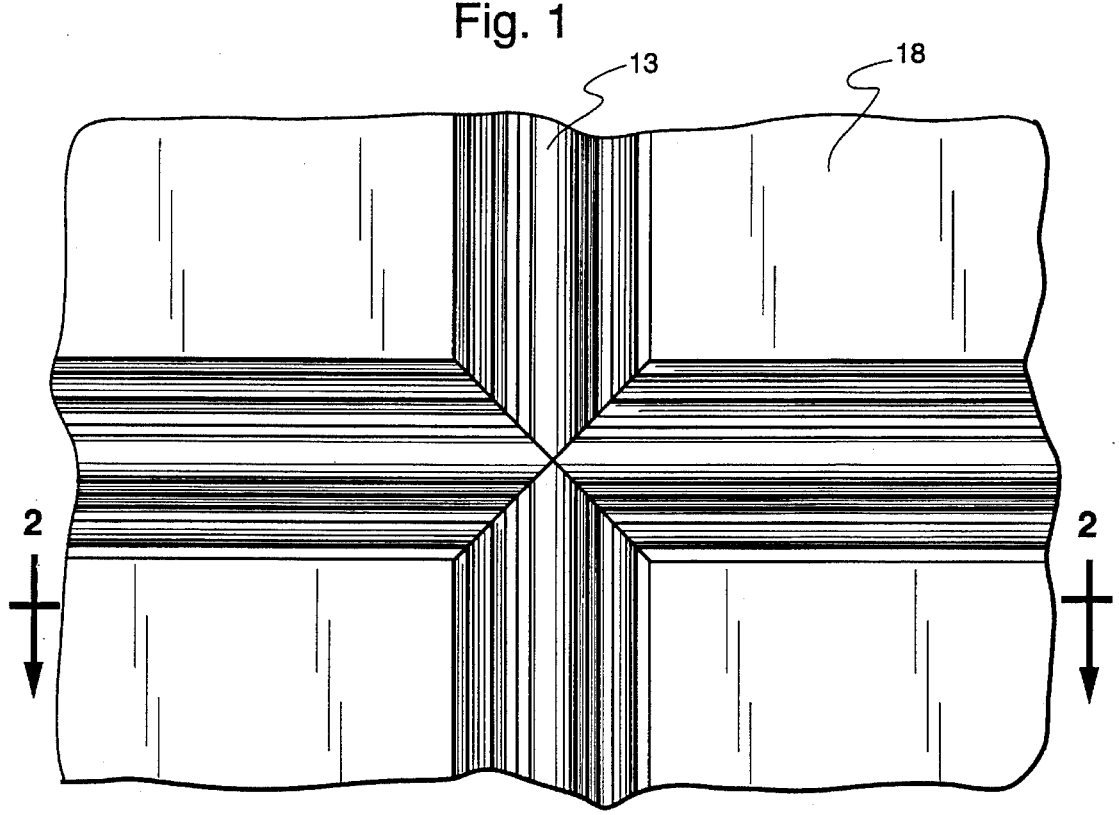
FIGS. 1 and 3 are bottom views of the subceiling at the mitered intersection of four beams, each of two beam designs is shown in cross-section in FIGS. 2 and 4.
Figure 3:
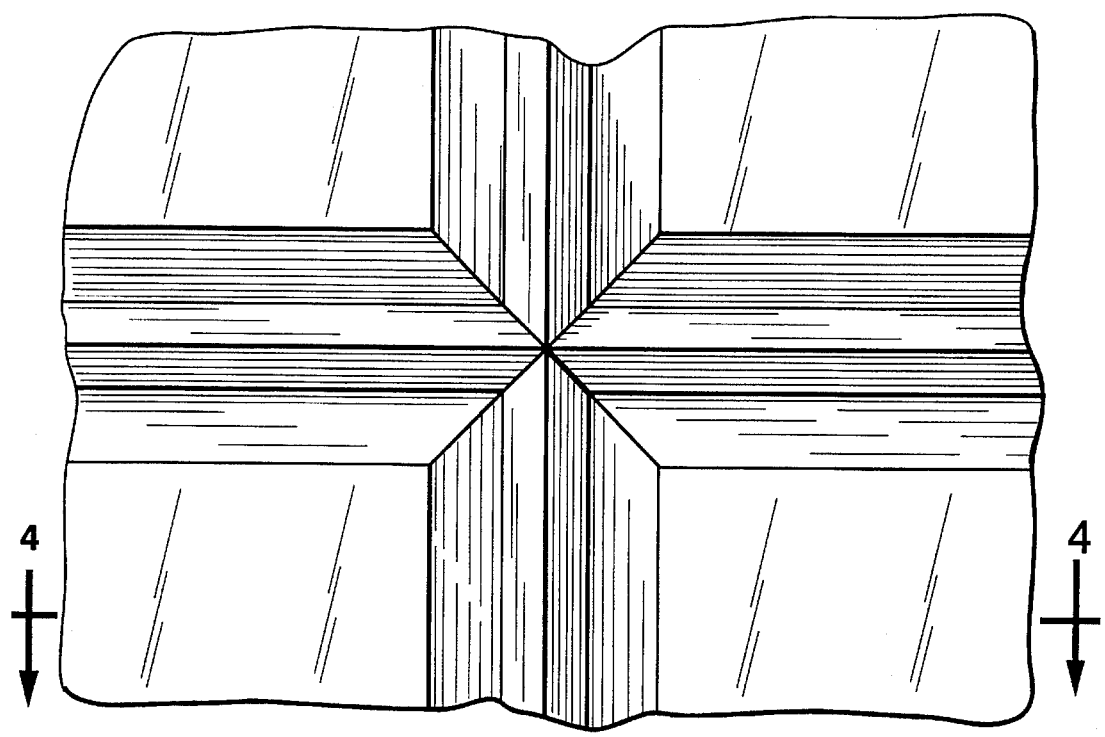

FIGS. 1 and 3 are bottom views of the subceiling composed of ceiling panels 18 and mitered beams having the decorative elements 13 shown in FIGS. 2 and 4, respectively.

FIG. 5 is a top view of the four intersecting mitered beams shown in FIGS. 1 and 2. It will be noted that although they are not shown, the inverted T-bar rails used as runners and cross members may be the standard "unmitered" rails currently employed for the suspended framework that constitutes the grid.

What is claimed is:

1. In combination, a subceiling of the type having panels supported by a suspended framework consisting essentially of (1) longitudinally extending main runner members and cross runner members, each runner member being configured as an Inverted T-bar rail having a transverse pair of opposed bottom flanges extending longitudinally, (2) a plurality of miniature plastic beams, each having sufficient flexibility to be snapped over said flanges of the T-bar rails, each of said beams consisting essentially of:

two flat portions each having an upper surface and a bottom surface and a width defined by two longitudinal edges;

a first return flange disposed along one upper edge of one flat portion integral therewith and extending inwardly;

a second return flange disposed along the second flat portion integral therewith and extending inwardly;

each of said return flanges having a downwardly-facing surface and an inwardly-facing edge;

said return flanges adapted to hold the upper surface of each flat portion substantially flush against the longitudinally extending T-bar rails of the runner member;

a pair of inwardly sloped sidewalls integral with and extending downwardly from said bottom surfaces of said flat portions and longitudinally along the length of said bottom surfaces of said flat portions, said sidewalls being connected to each other or integral with each other to provide a V-shaped or U-shaped visual appearance when viewed from below; and (3) a plurality of panels extending longitudinally with said runner members, said panels adapted to rest on the return flanges of the beams.

2. A suspended framework consisting essentially of (1) longitudinally extending main runner members and cross runner members, each runner member being configured as an inverted T-bar rail having a transverse pair of opposed bottom flanges extending longitudinally, and (2) a plurality of miniature plastic beams having sufficient flexibility to be snapped over said flanges of the T-bar rails, each of said beams consisting essentially of:

two flat portions each having an upper surface end a bottom surface and a width defined by two longitudinal edges;

a first return flange disposed along one upper edge of one flat portion integral therewith and extending inwardly;

a second return flange disposed along the second flat portion integral therewith and extending inwardly;

each of said return flanges having a downwardly-facing surface and an inwardly-facing edge;

said return flanges adapted to hold the upper surface of each flat portion substantially flush against the longitudinally extending T-bar rails of the runner member;

a pair of inwardly sloped sidewalls integral with and extending downwardly from said bottom surface of said flat portions and longitudinally along the length of said bottom surfaces of said flat portions, said sidewalls being connected to each other or integral with each other to provide a V-shaped or U-shaped visual appearance when viewed from below.

3. A suspended framework as in claim 2 wherein said beams are fabricated from a flexible tough plastic selected from the group consisting of polypropylene, high density polyethylene and an acrylic polymer.

4. A suspended framework as in claim 2 wherein said beams are adapted to be snapped over said flanges of said T-bar rails by application of pressure at the longitudinal meeting edge of said inwardly sloped sidewalls of said plastic beams.

\* \* \* \* \*